United States Patent [19]

Yasuda et al.

[11] 4,011,588
[45] Mar. 8, 1977

[54] ROTARY HEAD TYPE MAGNETIC TAPE VIDEO RECORDING-REPRODUCING DEVICE

[75] Inventors: Fujio Yasuda; Teruo Saito; Mamoru Hiroyasu, all of Saijyo, Japan

[73] Assignee: Matsushita Electric Industrial Co., Ltd., Japan

[22] Filed: May 22, 1975

[21] Appl. No.: 579,859

[30] Foreign Application Priority Data

May 30, 1974  Japan .............................. 49-61108

[52] U.S. Cl. .................................................. 360/71
[51] Int. Cl.² ......................................... G11B 15/43
[58] Field of Search ................... 360/71, 74, 84, 85

[56] References Cited
UNITED STATES PATENTS 3,317,679  5/1967  Rank ................................... 360/71

Primary Examiner—Robert S. Tupper
Attorney, Agent, or Firm—Burgess Ryan and Wayne

[57] ABSTRACT

In a rotary head type magnetic tape video recording-reproducing device of the type in which a magnetic tape from a supply reel is wrapped around a rotary drum carrying magnetic heads along the path of revolution thereof at an angle other than 0° relative to the axis of rotation of said rotary drum, and is taken up by a take-up reel for recording or reproducing, when a stop button is depressed or the power supply to a take-up reel driving motor is interrupted, the motor is stopped and then immediately reversed in direction for a predetermined time, thereby loosening the tension of the magnetic tape. This arrangement prevents the adhesion of the magnetic tape to the surfaces of the magnetic tape passages, especially of the rotary drum, due to the moisture or the condensation of vapor so that the smooth re-starting of the magnetic tape may be ensured.

5 Claims, 3 Drawing Figures

ROTARY HEAD TYPE MAGNETIC TAPE VIDEO RECORDING-REPRODUCING DEVICE

BACKGROUND OF THE INVENTION

The present invention relates to a rotary head type magnetic tape video recording-reproducing device.

In the magnetic video recording-reproducing devices of the type using the magnetic tapes such as video tape recorders, considerably strong tension is exerted on the magnetic tape in order to ensure the intimate contact of the magnetic tape with the magnetic heads and the smooth transport of the magnetic tape even when the transport of the magnetic tape is interrupted. Especially in the systems in which the magnetic tape of a relatively greater width is used and the area of surface of contact between the magnetic tape and the guide passage toward the magnetic heads is relatively large, the magnetic tape tends to stick to the guide passage due to the moisture or the condensation of vapor when the transport of the magnetic tape is once interrupted so that the re-starting of the magnetic tape becomes sometimes impossible or unstable. Such effect is pronounced especially in the single- or double-head magnetic tape video recording-reproducing device in which the magnetic tape is wrapped around the cylindrical drum carrying the magnetic head or heads.

SUMMARY OF THE INVENTION

In view of the above, one of the objects of the present invention is to provide a rotary head type magnetic tape video recording-reproducing device which may ensure the smooth and stable transport of the magnetic tape after the transport of the magnetic tape has been interrupted.

Another object of the present invention is to provide a rotary head type magnetic tape video recording-reproducing device in which the tension of the magnetic tape may be released or loosened immediately when the transport of the magnetic tape is interrupted in order to prevent the sticking of the magnetic tape to the guide passage thereof due to the moisture or condensation of vapor, thereby ensuring the smooth and stable re-starting of the magnetic tape.

A further object of the present invention is to provide a rotary head type magnetic tape video recording-reproducing device in which a take-up or supply reel or both of them are rotated through a small angle in the direction in which the magnetic tape may be loosened when the transport thereof is interrupted so that the sticking of the magnetic tape to the guide passage may be completely prevented to ensure the smooth and stable re-starting of the magnetic tape.

To the above and other ends, the present invention provides for the rotary head type magnetic tape video recording-reproducing device of the type described above means for loosening the tension of the tape immediately when the transport of the magnetic tape is interrupted, whereby the smooth and stable re-starting thereof may be ensured.

DESCRIPTION OF THE PREFERRED EMBODIMENTS

Principle of the Invention

Prior to the description of the preferred embodiments of the present invention, the underlying principle thereof will be described. In the recording or reproducing mode, the supply and take-up reels and a rotary drum carrying a rotary magnetic head or heads are all rotating. When a stop button is depressed or when the power supply is interrupted, a motor for driving the take-up and supply reels and the rotary drum is stopped, but is driven for a predetermined relatively short time in the reverse direction a predetermined time after it has been stopped by a circuit to be referred to as "a delayed reverse driving circuit" in this specification. Therefore the take-up or supply reel is rotated through a small angle in the direction in which the magnetic tape is rewound or loosened while the rotary drum carrying the magnetic head or heads keeps rotating due to its inertia. As a result when the rotary drum is completely stopped, the magnetic tape around it is uniformly loosened. If the magnetic tape is loosened after the rotary drum has been completely stopped, there is a fear that some parts of the magnetic tape are still in intimate contact with the rotary drum, resulting in the partial sticking of the magnetic tape to the rotary drum. Therefore, according to the present invention the delayed reverse driving circuit is so arranged as to rotate the driving motor in the reverse direction before the rotary drum is completely stopped. Both the take-up and supply reels are completely stopped before the rotary drum is stopped and the magnetic tape around the rotary drum is sufficiently loosened so as to be spaced apart therefrom by a sufficient distance. Therefore, there is no fear that the magnetic tape sticks to the surface of the rotary drum so that the smooth and stable re-starting of the magnetic tape may be effected at any time.

FIRST EMBODIMENT, FIGS. 1 AND 2

Next referring to FIGS. 1 and 2, the first embodiment based on the above underlying principle of the present invention will be described in detail hereinafter.

Figure 1:
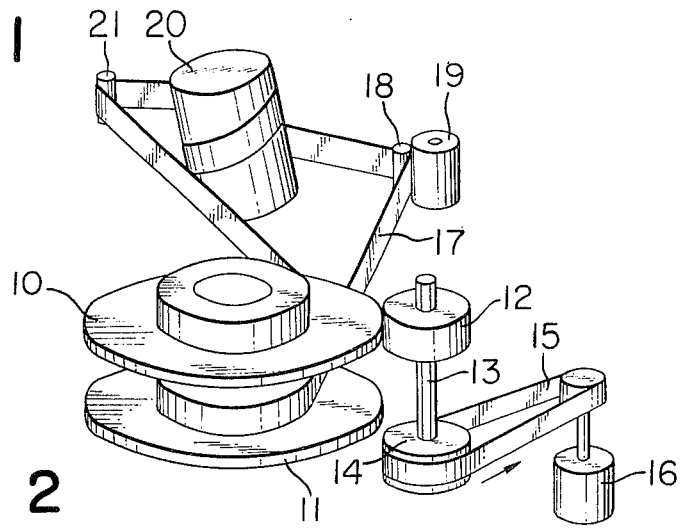
FIG. 1 is a schematic perspective view of a video tape recorder to which is applied the present invention.

First referring to FIG. 1, reference numeral 10 denotes a take-up reel; 11, a supply reel; 12, an idler which is axially slidably mounted on a shaft 13 and selectively pressed against the rim of either the take-up reel 10 or supply reel 11 for transmitting the driving power, but is pressed against the rim of the take-up reel 10 when the recording-reproducing device is de-energized; 14, a pulley mounted upon the shaft 13 and drivingly coupled with an endless belt 15 to the driving shaft of a DC motor 16; 17, a magnetic tape; 18, a capstan; and 19, a pinch roller. The magnetic tape 17, which is pulled at a constant speed by the cooperation of the capstan 18 and the pinch roller 19, passes around a rotary drum 20 at an angle other than zero along the path of revolution of magnetic heads (not shown) carried by the drum 20, and is guided by a guide pin 21 to be taken up by the take-up reel 10. In operation, the motor 16 is driven in the direction indicated by the arrow, but when the video tape recording-reproducing device is de-energized, the motor 16 is stopped and rotated in the reverse direction; that is, the direction opposite to that indicated by the arrow so that the tension of the magnetic tape 17 may be loosened.

Next referring to FIG. 2, a delayed reverse driving circuit for driving the motor 16 will be described. The terminals of the DC motor 16 are connected to movable contacts a of switches $S_1$ and $S_2$. The movable contact a of the switch $S_2$ is connected through resistor $R_1$ and $R_2$ to the gate of a thyristor $T_1$. A stationary contact b of the switch $S_1$ is connected to the positive terminal of a power supply and the stationary contact c thereof is connected to the anode of the thyristor $T_1$. The stationary contact b of the switch $S_2$ is connected to the negative terminal of the power supply, and the contact c, to the stationary contact b of a switch $S_3$ and through a capacitor $C_1$ to the cathode of the thyristor $T_1$ and to a grounding terminal. The movable contact a of the switch $S_3$ is connected through a resistor $R_3$ to a DC power supply +B. The gate of the thyristor $T_1$ is connected through a capacitor $C_2$ and a switch $S_4$ to the cathode, and the junction between the resistors $R_1$ and $R_2$ is connected through a diode $D_1$ and a resistor $R_4$ to the grounding terminal. The switches $S_1$ through $S_4$ are so arranged that when the magnetic tape 17 is transported, the movable contacts a thereof are made into contact with the stationary contacts b to drive the motor 16 is the direction indicated by the arrow in FIG. 1. When the stop button is depressed (not shown) or the power supply is cut off, the movable contacts a of the switches $S_1$ through $S_4$ are immediately switched to close the stationary contacts c. These switches $S_1$ through $S_4$ may be a relay assembly consisting of four make-break relays interlocked with the start and stop buttons (not shown) of the video tape recording-reproducing device. Thus, when the start button is depressed, the capacitor $C_1$ is charged by the current flowing from the power supply +B through the overcurrent protective resistor $R_3$ and the closed switch $S_3$, but the capacitor $C_2$ is discharged because the movable contact a of the switch $S_4$ is made into contact with the stationary contact b as shown in FIG. 2. When the stop button is depressed or when the power supply is cut off when the motor 16 is driven in the direction indicated by the arrow in FIG. 1, the movable contacts a of the switches $S_1$ through $S_4$ are switched to close the contacts c, so that the motor 16, which has a relatively small inertia, may be immediately stopped, but the rotary drum 20 keeps rotating. The voltage across the capacitor $C_1$ is applied through the switch $S_2$ (its movable contact a closing the stationary contact c), and the resistors $R_1$ and $R_2$ to the gate of the thyristor $T_1$ so that the thyristor $T_1$ conducts. Now the capacitor $C_1$ is discharged through the switch $S_2$, the motor 16, the switch $S_1$ and the thyristor $T_1$. That is, the voltage with the polarity opposite to that of the power supply to the motor 16 is applied so that the motor 16 is rotated in the opposite direction for a relatively short time mainly dependent upon the value of the capacitor $C_1$, whereby the tension of the magnetic tape 17 is immediately loosened. The time interval between the time when the power supply is cut off and the time when the motor 16 is started to rotate in the opposite direction is dependent upon the values of the resistors $R_2$, $R_3$ and $R_4$ and the capacitor $C_2$.

The diode $D_1$ is inserted in order to compensate for temperature variations, and the switch $S_2$ is inserted so that when the magnetic tape 17 is transported the capacitor $C_2$ is kept completely discharged in order to obtain a constant delay time.

SECOND EMBODIMENT, FIG. 3

Figure 3:
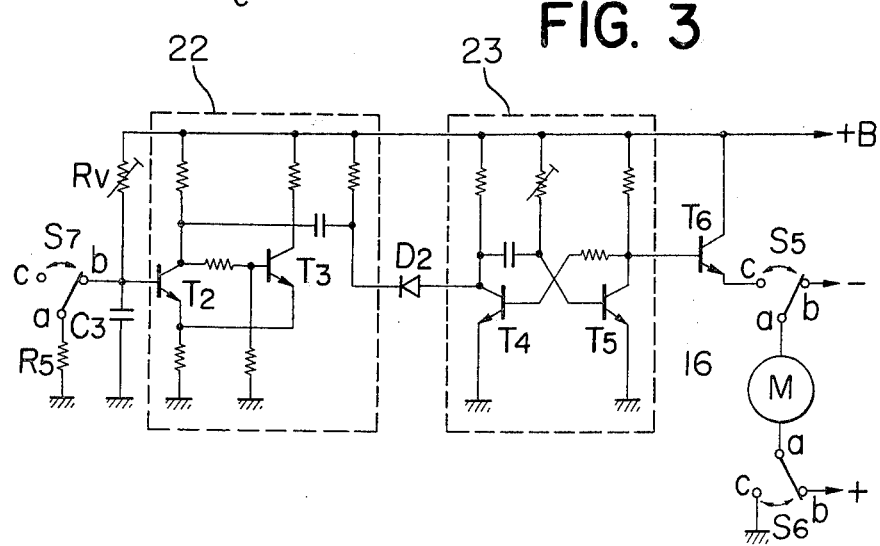

In the second embodiment shown in FIG. 3, a Schmitt trigger circuit generally indicated by 22 and consisting of transistors $T_2$ and $T_3$ is coupled through a diode $D_2$ to a one-shot multivibrator generally indicated by 23 and consisting of transistors $T_4$ and $T_5$. The output of the multivibrator 23 is connected to the base of a transistor $T_6$ whose collector is connected to a power supply +B. The emitter of the transistor $T_6$ is connected to the stationary contact c of a switch $S_5$ whose movable contact a is connected to one terminal of the motor 16. The stationary contact b of the switch $S_5$ is connected to the negative terminal of a power supply, and the other terminal of the motor 16. The stationary contact b of a switch $S_6$ is connected to the positive terminal of the power supply. The stationary contact c of the switch $S_6$ is grounded. The base of the transistor $T_2$ in the Schmitt trigger circuit 22 is connected to the junction between one terminal of a capacitor $C_3$ and a variable resistor Rv and to the stationary contact b of a switch $S_7$. The other terminal of the variable resistor Rv is connected to the +B supply, and the other terminal of the capacitor $C_3$ is grounded. The movable contact a of the switch $S_7$ is grounded through a resistor $R_5$.

Next the mode of operation will be described. When the start button is depressed, the motor 16 is connected to the power supply through the switches $S_5$ and $S_6$ as their movable contacts a close the stationary contacts b so that the motor 16 is driven in the direction indicated by the arrow in FIG. 1. The movable contact $S_7$ is also made into contact with the stationary contact b so that the transistor $T_2$ remains turned off.

Figure 2:
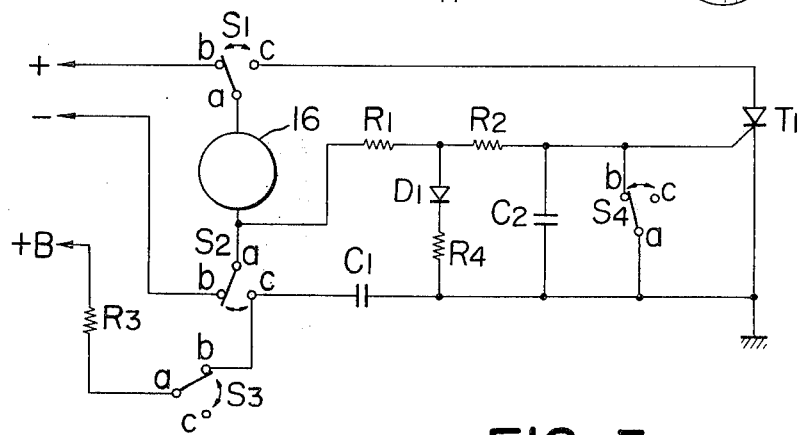
FIGS. 2 and 3 are circuit diagrams of a first and second embodiments of the present invention.

As with the first embodiment shown in FIG. 2, when the stop button is depressed or the power supply is cut off the switches $S_5$, $S_6$ and $S_7$ are so switched as to close the stationary contacts c. As a result, the transistor $T_2$ conducts so that the multivibrator 22 gives the pulse signal with a predetermined pulse width to the transistor $T_6$. The transistor $T_6$ conducts so that the motor 16 is driven in the opposite direction, whereby the magnetic tape 17 may be loosened.

What is claimed is:

1. A rotary head type magnetic tape video recording-reproducing device of the type wherein a magnetic tape is transported to and from and is wrapped at least one turn around a rotary member carrying at least one rotary magnetic head along a path of revolution thereof at an angle other than 0° relative to the axis of rotation of said rotary member for sequentially recording information upon said magnetic tape or reproducing information therefrom during transport of the tape, and wherein one end of said magnetic tape is wrapped around a supply reel and the other end thereof wrapped around a take-up reel, means including a power supply for selectively driving one of said reels, the improvement wherein means are provided responsive to the interruption of said power supply for reversing the direction of said selected driven reel through a predetermined angle.

2. A rotary head type magnetic tape video recording-reproducing device as set forth in claim 1 wherein said means for selectively driving said supply reel and said take-up reel comprises a DC motor, and wherein said power supply comprises means for impressing on said DC motor a voltage of a given polarity, and wherein said reversing means comprises means responsive to the interruption of said power supply for impressing on said DC motor for a predetermined time a voltage having a polarity opposite to said given polarity.

3. A rotary head type magnetic tape video recording-reproducing device as set forth in claim 2, wherein said means for impressing for a predetermined time the voltage of the polarity opposite to said given polarity comprises a capacitor, means for charging said capacitor to said voltage of said opposite polarity, and means responsive to the interruption of said power supply for discharging said capacitor through said motor.

4. A rotary head type magnetic tape video recording-reproducing device as set forth in claim 3, wherein said capacitor discharging means comprises a first switch having a movable contact connected to said motor and having at least two stationary contacts, said movable contact of said first switch being normally connected to a first of said stationary contacts of said first switch, said first stationary contacts of said first switch being connected to said power supply, a voltage controlled switching device having a main current path and a controlled terminal, a second stationary contact of said first switch being connected through said main current path of said voltage controlled switching device to one side of said capacitor, a second switch having a movable contact and at least two stationary contacts, said movable contact of said second switch being connected to said movable contact of said first switch through said motor, a first of said stationary contacts of said second switch being connected to said power supply, the movable contact of said second switch normally contacting said first stationary contact of said second switch, whereby said motor is normally connected to said power supply through said movable contacts and said first stationary contacts of said first and second switches, a second stationary contact of said second switch being connected to a side of said capacitor remote from said voltage controlled switching device, a third normally conducting switch connected to said second stationary terminal of said second switch and to said capacitor, means for charging said capacitor through the normally conducting third switch, the movable contacts of said first and said second switches being actuated to make contact with said second stationary contacts of said first and said second switches in response to the interruption said power supply, said third switch being actuated to a nonconducting position in response to the interruption of said power supply, means connecting the control terminal of said voltage controlled switching device to said movable contact of said second switch, said voltage controlled switching device providing a low resistance in said main current path in response to the voltage across said capacitor through said second switch, whereby the interruption of said power supply terminates the charging of said capacitor and causes said voltage controlled switching device to provide a low resistance discharge path for said capacitor through said motor.

5. A rotary head type magnetic tape video recording-reproducing device as set forth in claim 1, wherein said means for selectively driving said reels comprises a DC motor and a power supply, and wherein said reversing means comprises a Schmitt trigger means for providing a pulse at an output thereof in response to the interruption of said power supply, a mono-stable multi-vibrator connected to the output of said Schmitt trigger means for providing an output signal of a predetermined duration and of a polarity opposite to said power supply polarity, and switch means normally connecting said motor to said power supply and responsive to the interruption of said power supply for connecting said motor to the output of said mono-stable multi-vibrator.

* * * * *